(12) United States Patent
Verkruijsse et al.

(10) Patent No.: US 12,543,959 B2
(45) Date of Patent: Feb. 10, 2026

(54) DEVICE, SYSTEM AND METHOD FOR MONITORING OF PERIPHERAL ARTERIAL PERFUSION OF A SUBJECT

(71) Applicant: KONINKLIJKE PHILIPS N.V., Eindhoven (NL)

(72) Inventors: Willem Verkruijsse, Veldhoven (NL); Rick Bezemer, Amsterdam (NL); Calina Ciuhu, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1199 days.

(21) Appl. No.: 16/323,567

(22) PCT Filed: Aug. 1, 2017

(86) PCT No.: PCT/EP2017/069375
§ 371 (c)(1),
(2) Date: Feb. 6, 2019

(87) PCT Pub. No.: WO2018/029033
PCT Pub. Date: Feb. 15, 2018

(65) Prior Publication Data
US 2019/0175030 A1 Jun. 13, 2019

(30) Foreign Application Priority Data
Aug. 9, 2016 (EP) .................................. 16183398

(51) Int. Cl.
*A61B 5/02* (2006.01)
*A61B 5/00* (2006.01)
(Continued)

(52) U.S. Cl.
CPC ...... *A61B 5/02007* (2013.01); *A61B 5/02028* (2013.01); *A61B 5/0261* (2013.01);
(Continued)

(58) Field of Classification Search
CPC ............ A61B 5/02007; A61B 5/02028; A61B 5/0261; A61B 5/0295; A61B 5/7221; A61B 2562/0233
See application file for complete search history.

(56) References Cited

U.S. PATENT DOCUMENTS 6,547,740 B2 4/2003 Sugo
8,771,195 B2 7/2014 Kim
(Continued)

FOREIGN PATENT DOCUMENTS

WO 2008144404 11/2008
WO 2013/030744 3/2013

OTHER PUBLICATIONS

Blanik et al. "Hybrid Optical Imaging Technology for Long-Term Remote Monitoring of Skin Perfusion and Temperature Behavior." Journal of Biomedical Optics 19(1), 016012 (Jan. 2014) (Year: 2014).*
(Continued)

*Primary Examiner* — Hien N Nguyen (57) ABSTRACT

The present invention relates to a device, system and method for monitoring of peripheral arterial perfusion of a subject. To enable distinguishing between low pulsatility caused by centralization or low cardiac output, the proposed device comprises an input (30) for receiving first detection data of a tissue region of a subject, said first detection data being acquired over time by detecting radiation reflected from and/or transmitted through tissue of the subject, and for receiving second detection data of a skin region of subject, said second detection data being acquired over time by detecting radiation received from said tissue region in response to coherent light being emitted towards said skin region, a PPG unit (32) for deriving a photoplethysmography, PPG, signal from said first detection data, a flow unit (34) for deriving, from said second detection data, a flow
(Continued)

signal indicative of a flow of light scattering particles within the skin region, and an evaluation unit (36) for evaluating said PPG signal and said flow signal to obtain information on the peripheral arterial perfusion, wherein the evaluation unit is adapted to determine a state of low vascular compliance and/or a state of low cardiac output based on a combined evaluation of said PPG signal and said flow signal.

8 Claims, 5 Drawing Sheets

(51) Int. Cl.
  *A61B 5/026* (2006.01)
  *A61B 5/0295* (2006.01)
(52) U.S. Cl.
  CPC .......... *A61B 5/0295* (2013.01); *A61B 5/7221* (2013.01); *A61B 2562/0233* (2013.01)

(56) References Cited

U.S. PATENT DOCUMENTS

| | | | |
|---|---|---|---|
| 9,980,650 B2 | 5/2018 | Bezemer | |
| 11,202,582 B2* | 12/2021 | Verkruijsse | ........ A61B 5/14552 |
| 2008/0067132 A1* | 3/2008 | Ross | ........ A61M 1/341 |
| | | | 210/739 |
| 2011/0082355 A1 | 4/2011 | Eisen | |
| 2013/0324814 A1 | 12/2013 | Maarek | |
| 2014/0276144 A1 | 9/2014 | Whitt | |
| 2015/0105638 A1 | 4/2015 | Eisen | |
| 2016/0058300 A1 | 3/2016 | Yoon | |
| 2016/0058364 A1* | 3/2016 | Ionescu | ........ A61B 5/14546 |
| | | | 600/407 |
| 2016/0106327 A1 | 4/2016 | Yoon | |
| 2019/0167124 A1* | 6/2019 | Verkruijsse | ........ A61B 5/14552 |

OTHER PUBLICATIONS

Humeau-Heurtier et al. "Relevance of Laser Doppler and Laser Speckle Techniques for Assessing Vascular Function: State of the Art and Future Trends." IEEE Transactions on Biomedical Engineering, vol. 60, No. 3, Mar. 2013 (Year: 2013).*

Klabunde, Richard E. "Vascular Compliance" Revised Dec. 9, 2016. Retrieved from https://www.cvphysiology.com/Blood%20Pressure/BP004. Retrieved Aug. 18, 2022. (Year: 2016).*

Yan et al. "A Model-based Artifact Reduction Method for the Non-invasive Estimation of Blood Oxygen Saturation." IEEE/EMBS International Summer School on Medical Devices and Biosensors (ISSS-MD) pp. 90-92. 2004. (Year: 2004).*

Zhara Abdollahi, et al., Evaluation of a Combined Reflectance Photoplethysmography and Laser Dopler Flowmetry Surface Probe, 35th Annual International Conference of IEEE EMBS, pp. 1728-1731.

Farley et al: "Optical determination of carcdiovascular health at a distance", SPIE—International Society for Optical Engineering. Proceedings, vol. 7703, Apr. 5, 2010.

Lindberg et al: "Photoplethysmography. \Part 1 Comparison With Laser Doppler Flowmetry", Medical and Biological Engineering and Computing, Springer, Heildelberg, DE, vol. 29, No. 1, Jan. 1, 1991.

Allen et al: "Microvascular imaging: techniques and opportunities for clinical physiological measurements". Physiological Measurement, Institute of Physics Publishing, Bristol, GB, vol. 35, No. 7, Jun. 9, 2014.

Verkruysse et al: "Remote plethysmographic imaging using ambient light", Optics Express, vol. 16, No. 26, Dec. 2008.

Briers: "Laser Doppler and time-varying speckle: a reconciliation" in the Journal of the Optical Society of America, vol. 13, No. 2, 1996.

Briers: "Laser Doppler, speckle and related techniques for blood perfusion mapping and imaging", physiol. Meas. 22, R35-R66, 2001.

Lima et al: "Noninvasive monitoring of peripheral perfusion" Intensive Care Medicine, Oct. 2005, vol. 31, Issue 10, pp. 1316-1326.

* cited by examiner

DEVICE, SYSTEM AND METHOD FOR MONITORING OF PERIPHERAL ARTERIAL PERFUSION OF A SUBJECT

CROSS REFERENCE TO RELATED APPLICATIONS

This application is the U.S. National Phase application under 35 U.S.C. § 371 of International Application No. PCT/EP2017/069375 filed Aug. 1, 2017, published as WO 2018/029033 on Feb. 15, 2018, which claims the benefit of European Patent Application Number 16183398.3 filed Aug. 9, 2016. These applications are hereby incorporated by reference herein.

FIELD OF THE INVENTION

The present invention relates to a processing device, system and method for monitoring of peripheral arterial perfusion of a subject.

BACKGROUND OF THE INVENTION

Peripheral perfusion is a common hemodynamic aspect that needs to be measured for critically ill patients. Photoplethysmography (PPG) is a known technology that can be used to monitor perfusion. PPG is an optical measurement technique that evaluates a time-variant change of light reflectance or transmission of an area or volume of interest. PPG is based on the principle that blood absorbs light (more than surrounding tissue), so variations in blood volume with every heart beat affect transmission or reflectance correspondingly. Besides information about the heart rate, a PPG waveform can comprise information attributable to further physiological phenomena such as the respiration. By evaluating the transmittance and/or reflectivity at different wavelengths (typically red and infrared), the blood oxygen saturation can be determined.

Unobtrusive vital sign monitoring using a video camera, or remote PPG, has been demonstrated and found relevant for patient monitoring. Remote PPG imaging is, for instance, described in Wim Verkruysse, Lars O. Svaasand, and J. Stuart Nelson, "Remote plethysmographic imaging using ambient light", Optics Express, Vol. 16, No. 26, December 2008. It is based on the principle that temporal variations in blood volume in the skin lead to variations in light absorptions by the skin. Such variations can be registered by a video camera that takes images of a skin area, e.g. the face, while processing calculates the pixel average over a selected region (typically part of the cheek in this system). By looking at periodic variations of this average signal, the heart beat rate and respiratory rate can be extracted. There are meanwhile a number of further publications and patent applications that describe details of devices, systems and methods for obtaining vital signs of a patient by use of remote PPG.

Thus, the pulsation of arterial blood causes changes in light absorption. Those changes observed with a photodetector (or an array of photodetectors) form a PPG (photoplethysmography) signal (also called, among other, a pleth wave). Pulsation of the blood is caused by the beating heart, i.e. peaks in the PPG signal correspond to the individual beats of the heart. Therefore, a PPG signal is a heartbeat signal in itself. The normalized amplitude of this signal is different for different wavelengths, and for some wavelengths it is also a function of blood oxygenation.

US 2015/0105638 A1 and US 2011/0082355 A1 disclose a system and method for measuring one or more light-absorption related blood analyte concentration parameters of a mammalian subject. The system comprises: a) a photoplethysmography (PPG) device configured to effect a PPG measurement by illuminating skin of the subject with at least two distinct wavelengths of light and determining relative absorbance of each of the wavelengths; b) a dynamic light scattering measurement (DLS) device configured to effect a DLS measurement of the subject to rheologically measure a pulse parameter of the subject; and c) electronic circuitry configured to: i) temporally correlating the results of the PPG and DLS measurements; and ii) in accordance with the temporal correlation between the PPG and DLS measurements, assessing value(s) of the one or more light-absorption related blood analyte concentration parameter(s).

Farley et al.: "Optical determination of cardiovascular health at a distance", proceedings of the International Society for Optical Engineering (SPIE), vol. 7703, 77030R, 2010, refers to using a laser speckle detector for optical determination of cardiovascular health at a distance. A conventional PPG device is used as a trusted reference to gauge the signals acquired using the laser speckle detector.

Lindberg et al.: "Photoplethysmography, Part 1: Comparison with laser Doppler flowmetry", Medical and Biological Engineering and Computing, vol. 29, No. 1, pages 40-47, 1991, refers to a comparison of photoplethysmography (PPG) and laser Doppler flowmetry (LDF).

WO 2013/030744 A1 discloses a wearable pulse oximetry device that is mounted on a wrist strap and fixates an area above a distal end of the ulna with a dome-shaped structure. This area is used as the measuring area. The measurement is carried out by a detector positioned above the fixated area that detects light emitted by light sources having different wavelengths that are located at a periphery of the fixated area. Hence, the reflections are measured at neither a reflection mode nor a transmission mode, but are at an angle between 20° and 160° from the emitted light. This mode, termed trans-illumination, shall allow achieving an excellent signal-to-noise ratio and shall enable continuous and reliable measurement of oximetry data on the wrist. It is further describes that coherent light scattering (CLS) can be used for coping with motion artifacts.

If a PPG signal is low, two scenarios are possible:
i) The patient is centralized or suffers from vascular stiffness. The blood vessels are relatively stiff (high arteriolar and venular tone resulting in high vascular resistance) and the response to the blood volume variation in a cardiac cycle is also low. This has to do with the inability of the blood vessels walls to respond to the heartbeat induced pulsatile pressure/flow variation. Hence, the vascular compliance, i.e., the ability to dilate upon arrival of a blood pressure pulse, is low.
ii) There is low cardiac output. In this case the weakness of the PPG signal is caused by lower blood volume in a heartbeat.

PPG monitoring for peripheral perfusion can thus not distinguish between low pulsatility caused by low vascular compliance (due to centralization and/or vascular stiffness) or caused by low cardiac output.

SUMMARY OF THE INVENTION

It is an object of the present invention to provide a processing device, system and method for use in monitoring of peripheral arterial perfusion of a subject which enable distinguishing between low pulsatility caused by low vascular compliance or low cardiac output. In particular, it would be advantageous to provide a processing device provide a processing device, system and method for use in monitoring of peripheral arterial perfusion of a subject which support distinguishing between well-compensated and ill-compensated hypovolemia.

In a first aspect of the present invention a processing device for use in monitoring of peripheral arterial perfusion of a subject is presented, said processing device comprising
  an input for receiving first detection data of a tissue region of a subject, said first detection data being acquired over time by detecting radiation reflected from and/or transmitted through tissue of the subject, and for receiving second detection data of a skin region of a subject, said second detection data being acquired over time by detecting radiation received from said skin region in response to coherent light being emitted towards said skin region,
  a PPG unit for deriving a photoplethysmography, PPG, signal from said first detection data,
  a flow unit for deriving, from said second detection data, a flow signal indicative of a flow of light scattering particles within the skin region, and
  an evaluation unit for evaluating said PPG signal and said flow signal to obtain information on the peripheral arterial perfusion, wherein the evaluation unit is adapted to determine a state of low vascular compliance (e.g. a centralized vascular condition) and/or a state of low cardiac output based on a combined evaluation of said PPG signal and said flow signal.

In addition or in the alternative, the evaluation unit can be configured for evaluating said PPG signal and said flow signal to obtain information on the peripheral arterial perfusion, wherein the evaluation unit is adapted to determine a centralized vascular condition or a state of low cardiac output based on a combined evaluation of said PPG signal and said flow signal.

In a further aspect of the present invention a system for monitoring of peripheral arterial perfusion of a subject is presented, said system comprising:
  a detector for acquiring first detection data of a skin region of a subject, said first detection data being acquired over time by detecting radiation reflected from and/or transmitted through tissue of a subject, and for acquiring second detection data of a skin region of a subject, said second detection data comprising a sequence of images of said skin region acquired over time, and
  a processing device as disclosed herein for monitoring of peripheral arterial perfusion based on the acquired first detection data and second detection data.

In yet further aspects of the present invention, there are provided a corresponding method, a computer program which comprises program code means for causing a computer to perform the steps of the method disclosed herein when said computer program is carried out on a computer as well as a non-transitory computer-readable recording medium that stores therein a computer program product, which, when executed by a processor, causes the method disclosed herein to be performed.

Preferred embodiments of the invention are defined in the dependent claims. It shall be understood that the claimed method, system, computer program and medium have similar and/or identical preferred embodiments as the claimed, in particular as defined in the dependent claims and as disclosed herein.

The present invention is based on the idea to alleviate the above described ambiguity with respect to low pulsatility. It has been found that from a flow signal (e.g. a speckle signal or a laser Doppler signal) indicative of a flow of light scattering particles within the skin region (which is preferably identical to the tissue region), in particular based on interferometric techniques such as laser speckle imaging or laser Doppler, obtained in addition to a PPG signal, information on the peripheral arterial perfusion can be obtained. In particular, when the flow signal indicates a high flow velocity and the PPG signal measures a relatively low blood volume variation, the vascular compliance is low. In other words, the blood vessels are not sufficiently responding to the increase of blood flow. A similar conclusion can be drawn, a normal or high vascular compliance should prevent the blood flow velocity (measurable by the speckle signal or laser Doppler signal) to become high by increasing the blood volume (measured by the PPG signal).

Generally, first detection data and second detection data are obtained (i.e. received or retrieved from a detector or database) separately. For instance, a detector (e.g. a PPG sensor) may be used to acquire the first detection data and an imaging unit (e.g. a camera) may be used to acquire the second detection data. However, in an embodiment the second detection data are used as first detection data, i.e. the first detection data are identical to the second detection data, and the detector is an imaging unit for acquiring image data representing the second detection data.

As used herein, perfusion refers to how much blood flows through a given tissue region, i.e., units of blood volume per time per tissue volume. Perfusion can thus be high even in absence of pulsatile blood volume or pulsatile blood flow, i.e., even be high for a completely non-pulsatile flow. Vice versa, a strong PPG signal can be found in cases of low perfusion, for example, if there is a blockage of flow but high pulsatile input. Hence, as used herein, a (pulsatile) PPG signal originates from the pulsatile blood volume, i.e., is an absorption dominated signal indicative of absorption of light within the tissue region. On the other hand, the (pulsatile) flow signal originates from the (pulsatile) movement of particles within the tissue region. For example, a speckle pattern can be disturbed or a frequency shift can occur due to moving particles. The flow signal can be determined using the principles of Laser Doppler or laser speckle imaging (LSI). PPG signals and flow signals may thus be described as color-based probing of blood absorption and color-blind probing of the blood motion, respectively.

A PPG signal as used herein can be seen as conventional PPG signal indicative of an absorption of light within the tissue region at a given wavelength.

A flow signal as used herein can be obtained by techniques such as laser speckle imaging (LSI) or laser Doppler. Coherent (laser) light scattered from moving objects or particles produces intensity fluctuations that can be used to measure the velocity of the scatterers. An overview of laser Doppler and speckle is given by Briers, "Laser Doppler and time-varying speckle: a reconciliation" in the Journal of the Optical Society of America, vol. 13, no. 2, 1996 as well as in the topical review paper by Briers, "Laser Doppler, speckle and related techniques for blood perfusion mapping and imaging", physiol. Meas. 22, R35-R66, 2001. The flow signal can indicate the degree at which light received from the skin region of the subject is perturbed by moving particles such as blood cells. In a nutshell, laser Doppler velocimetry uses the frequency shift produced by the Doppler effect to measure velocity. It can be used to monitor blood flow in the body. Laser speckle refers to a random interference effect that gives a grainy appearance to objects illuminated by laser light. If the object comprises individual moving scatterers (such as blood cells), the speckle pattern fluctuates.

A low vascular compliance can be sub-divided or attributed to two different conditions: (i) vascular stiffness and (ii) a centralized condition". Vascular stiffness can refer to the stiffness/elasticity of the vascular wall, which may change for example with age and by cardiovascular disease. A centralized condition can refer to a compensatory cardiovascular state of the patient where the body increases the vascular tone (decreases the diameter) of the arteries in the peripheral tissues (arms and legs), to reduce the blood flow to these tissues, to direct more blood flow to the central organs. Vascular stiffness changes very slowly over time, typically in the order of years, while centralization may occur within seconds/minutes. Both increased stiffness and vascular tone lead to decreased vascular compliance (ability to dilate upon arrival of a blood pressure pulse). The solution proposed herein, by a combined evaluation of the PPG signal and the flow signal enables to probe the vascular compliance of the arteries in the studied tissues. The interpretation of changes in vascular compliance, whether this is due to changes in vascular stiffness or vascular tone, depends largely on the time scale at which the changes occur. As used herein the term vascular compliance can thus cover both (age-related) vascular stiffness and centralization.

In a further refinement, the evaluation unit is adapted to determine a state of well-compensated and ill-compensated hypovolemia based on a combined evaluation of the PPG signal and the flow signal.

For example, a condition of low cardiac output may lead to centralization which leads to vasoconstriction in peripheral tissues. Vasoconstriction decreases the diameter and compliance of the vessels. Although they become stiffer by this, this is caused by the smooth muscles around the arteries, rather than the arterial wall (i.e. not age-related stiffness due to arteriosclerosis), such that vascular compliance is decreased. When a patient becomes hypovolemic (i.e. he loses blood volume), the PPG signal is first expected to decrease while the flow will remain unchanged, as the body will centralize to redirect flow to the heart to maintain cardiac output even though blood volume is lower. As a second stage, when the body cannot compensate/centralize further, also cardiac output and the flow signal may decline. Hence, the combined evaluation enables to distinguish between well-compensated and ill-compensated hypovolemia. Advantageously, the evaluation unit can be configured to evaluating said PPG signal and said flow signal over time to distinguish between well-compensated and ill-compensated hypovolemia based on the transient behavior of the PPG signal and the flow signal, in particular, by evaluating changes in vascular compliance (PPG vs. LSI) and flow (LSI).

According to an embodiment said evaluation unit is configured to evaluate a speckle pattern represented by said flow signal (in this case representing a speckle signal). When a diffuse medium is illuminated, interference creates a speckle pattern. If there is motion in the medium, this causes motion blur in the speckle pattern, which can be used to extract information about the motion. This is evaluated according to this embodiment.

Hereby, the evaluation unit is preferably configured to evaluate motion blur by detecting speckle contrast variations.

According to another embodiment said evaluation unit is configured to evaluate a PPG ratio of the AC component to the DC component of the PPG signal and a speckle ratio of the AC component to the DC component of the flow signal. The PPG signal is composed of a pulsatile waveform (AC component), caused by the changes in blood volume with each heartbeat, overlapped on a slowly varying DC component at lower frequencies caused by respiration and motion. In analogy with the PPG signal, the flow signal can be decomposed into an AC component, reflecting the modulations in the blood flow velocity, and a DC component, reflecting the blood flow. Combining the two signals enables distinguish poor peripheral perfusion from low cardiac output.

The evaluation unit is advantageously configured to determine a state of well-compensated hypovolemia of the subject if the speckle ratio exceeds a first speckle threshold and if the PPG ratio is below a first PPG threshold and to determine a state of ill-compensated hypovolemia of the subject if the speckle ratio is below a second speckle threshold and if the PPG ratio is below the first PPG threshold.

In another embodiment the evaluation unit is configured to determine a state of non-compliant blood vessels (and a high peripheral perfusion) if the speckle ratio exceeds a second speckle threshold and if the PPG ratio exceeds a second PPG threshold and to determine a state of compliant blood vessels if the speckle ratio is below a second speckle threshold and if the PPG ratio exceeds the second PPG threshold. As explained above, the vascular compliance indicates the ability to dilate upon arrival of a blood pressure pulse. A (too) high flow in combination with a PPG ratio exceeding the second PPG threshold can indicated that the blood vessels do not sufficiently accommodate the arrival of the blood pressure pulse and can thus be indicative of non-compliant (or not sufficiently compliant) blood vessels. The respective thresholds may e.g. be predetermined and obtained from earlier measurements, e.g. as average of measurements for a plurality of subjects or from earlier measurements with the same subject. The thresholds may also be adaptive and may e.g. adjusted from time to time based on measurements with the same subject, for instance as a kind of learning system.

Optionally, the evaluation unit can be configured to evaluate a perfusion measure, more precisely a compliance measure P indicative of a ratio of the speckle ratio to the PPG ratio given by $$P = \frac{AC_{PPG}/DC_{PPG}}{AC_{flow}/DC_{flow}};$$

wherein the speckle ratio is the ratio of the AC component to the DC component of the flow signal; and wherein the PPG ratio is the ratio of the AC component to the DC component of the PPG signal. An increase in P can indicate an increased vascular compliance. A decrease in P accompanied by a decrease in DC flow can indicate a decrease in cardiac output.

The input is configured to obtain first detection data acquired in response to artificial illumination of the tissue region by predetermined radiation, in particular visible or infrared light. For this purpose, the system may comprise an illumination unit for artificial illumination of the tissue region by predetermined radiation, in particular visible or infrared light. For instance, one or more LEDs may be used as illumination unit, as e.g. conventionally used in PPG imaging. For obtaining second detection data, from which a flow signal is derived, a laser device for emitting a laser beam for illuminating the skin region may be used instead or in addition.

Preferably, in one embodiment, a single illumination unit is used for illuminating a skin region, which thus corresponds to the tissue region for which the PPG data are derived (which is generally preferred, but not mandatory), and only a single set of second detection data is acquired, from which the flow signal and the PPG signal are derived.

In an embodiment, the flow unit can be configured to derive the flow signal based on laser Doppler and/or laser speckle technique. According to the Doppler principle, light hitting moving particles such as blood cells undergo a change in wavelength/frequency (also referred to as Doppler shift), while light particles which encounter static structures return unchanged. Some of the light can be registered by a detector such as a photodiode. The flow signal can be calculated based on the detection data since the magnitude and frequency distribution of the Doppler shifted light are directly related to the number and velocity of the blood cells. The output signal can thus provide information about the microcirculatory blood flow at the first wavelength and at the second wavelength. For further details, regarding the underlying principles of laser Doppler and laser speckle techniques, reference is made to the aforementioned publications by Briers.

BRIEF DESCRIPTION OF THE DRAWINGS

These and other aspects of the invention will be apparent from and elucidated with reference to the embodiment(s) described hereinafter. In the following drawings

DETAILED DESCRIPTION OF EMBODIMENTS

Figure 1:
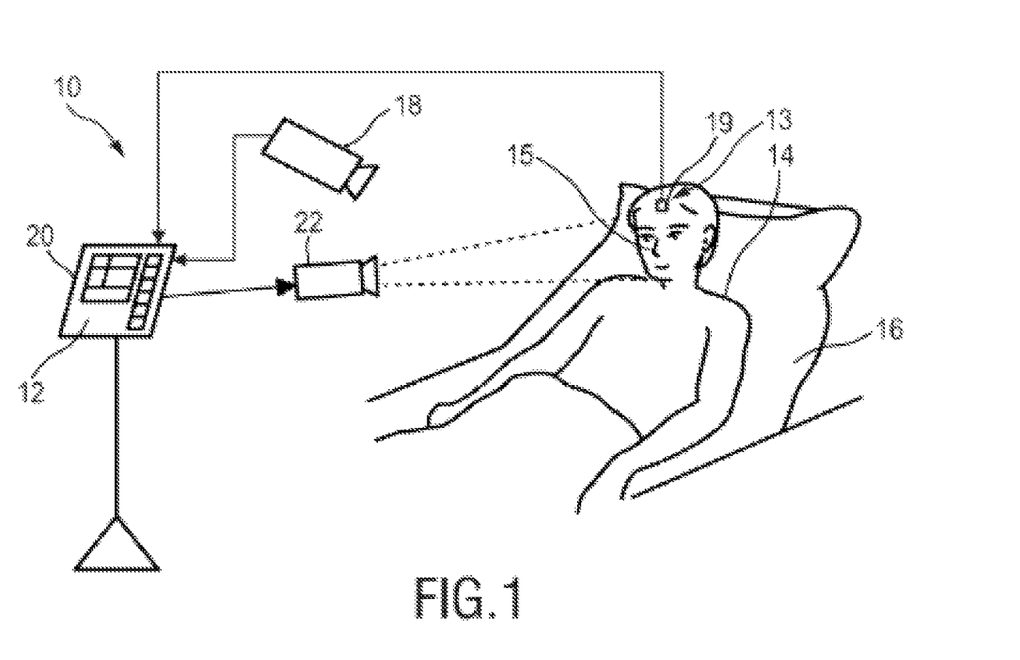
FIG. 1 shows a schematic diagram of a first embodiment of a system according to the present invention.

FIG. 1 shows a schematic diagram of a first embodiment of a system 10 and a processing device 12 for monitoring of peripheral arterial perfusion of a subject 14 according to the present invention. Hereinafter, the processing device 12 may be briefly referred to as device 12. The subject 14, in this example a patient, lies in a bed 16, e.g. in a hospital or other healthcare facility, but may also be a neonate or premature infant, e.g. lying in an incubator, or person at home or in a different environment.

Besides the device 12, the system 10 comprises a detector 18, 19 for acquiring first detection data of a tissue region 13 (e.g. the forehead, the cheek, a hand, etc.) of the subject 14, said first detection data being acquired over time by detecting radiation reflected from and/or transmitted through tissue of the subject 14, and for acquiring second detection data of a skin region 15 (e.g. the forehead, the cheek, a hand, etc., i.e. the same region as the tissue region or a different region) of the subject 14, said second detection data comprising a sequence of images of said skin region acquired over time. Based on the acquired first detection data and second detection data, the device 12 determines peripheral arterial perfusion of the subject 14.

There exist different embodiments for a detector (also called signal acquisition unit) for detecting electromagnetic radiation transmitted through or reflected from a subject and for acquiring second detection data. In the embodiment of the system 10 shown in FIG. 1 different embodiments are used together.

For acquiring second detection data of the subject 14 from the skin region 15, the detector comprises a camera 18 (also referred to as imaging unit) including a suitable photosensor for (remotely and unobtrusively) capturing image frames of the subject 14, in particular for acquiring a sequence of image frames of the subject 14 over time. The image frames captured by the camera 18 may particularly correspond to a video sequence captured by means of an analog or digital photosensor, e.g. in a (digital) camera. Such a camera 18 usually includes a photosensor, such as a CMOS or CCD sensor, which may also operate in a specific spectral range (visible, IR) or provide information for different spectral ranges. The camera 18 may provide an analog or digital signal. The image frames include a plurality of image pixels having associated pixel values. Particularly, the image frames include pixels representing light intensity values captured with different photosensitive elements of a photosensor. These photosensitive elements may be sensitive in a specific spectral range (i.e. representing a specific color). The image frames include at least two groups of some image pixels each being representative of a different skin region of the subject, e.g. the forehead, the cheek, the throat, the hand, etc. Thereby, an image pixel may correspond to one photosensitive element of a photo-detector and its (analog or digital) output or may be determined based on a combination (e.g. through binning) of a plurality of the photosensitive elements.

For acquiring first detection data of the tissue region 13 of the subject 14, the detector comprises an optical photoplethysmography sensor 19 (also referred to as contact PPG sensor) configured for being mounted to the tissue region 13 of the subject 14 for acquiring photoplethysmography signals from the tissue region 13. The PPG sensor 19 may e.g. be designed in the form of a finger-clip (as conventionally used for measuring blood oxygen saturation) or a sticker (as e.g. used for measuring heart rate), just to name a few of all the possible embodiments. The PPG sensor 19 may also be designed in other forms and arranged at other skin regions of the subject's body.

The system 10 may further optionally comprises a light source 22 (also called illumination source), such as a lamp or laser, for illuminating the tissue region 13 with light, for instance in a predetermined wavelength range or ranges (e.g. in the red, green and/or infrared wavelength range(s)). The light source 22 particularly comprises a coherent light source for emitting coherent light, in particular at a predetermined wavelength or wavelength range. The light reflected from said tissue region 13 in response to said illumination is detected by the camera 18. In another embodiment no dedicated light source is provided, but ambient light is used for illumination of the subject 14. From the reflected light only light in a desired wavelength ranges (e.g. green, red and/or infrared light, or light in a sufficiently large wavelength range covering at least two wavelength channels) may be detected and/or evaluated.

The device 12 is further preferably connected to an interface 20 for displaying the determined information and/or for providing medical personnel with an interface to change settings of the device 12, the camera 18, the PPG sensor 19, the light source 22 and/or any other parameters of the system 10. Such an interface 20 may comprise different displays, buttons, touchscreens, keyboards or other human machine interface means.

A system 10 as illustrated in FIG. 1 may, e.g., be located in a hospital, healthcare facility, elderly care facility or the like. Apart from the monitoring of patients, the present invention may also be applied in other fields such as neonate monitoring, general surveillance applications, security monitoring or so-called life style environments, such as fitness equipment, a wearable, a handheld device like a smartphone, or the like. The uni- or bidirectional communication between the device 12, the camera 18, the PPG sensor 19 and the interface 20 may work via a wireless or wired communication interface. Other embodiments of the present invention may include a device 12, which is not provided stand-alone, but integrated into the camera 18 or the interface 20.

Figure 2:
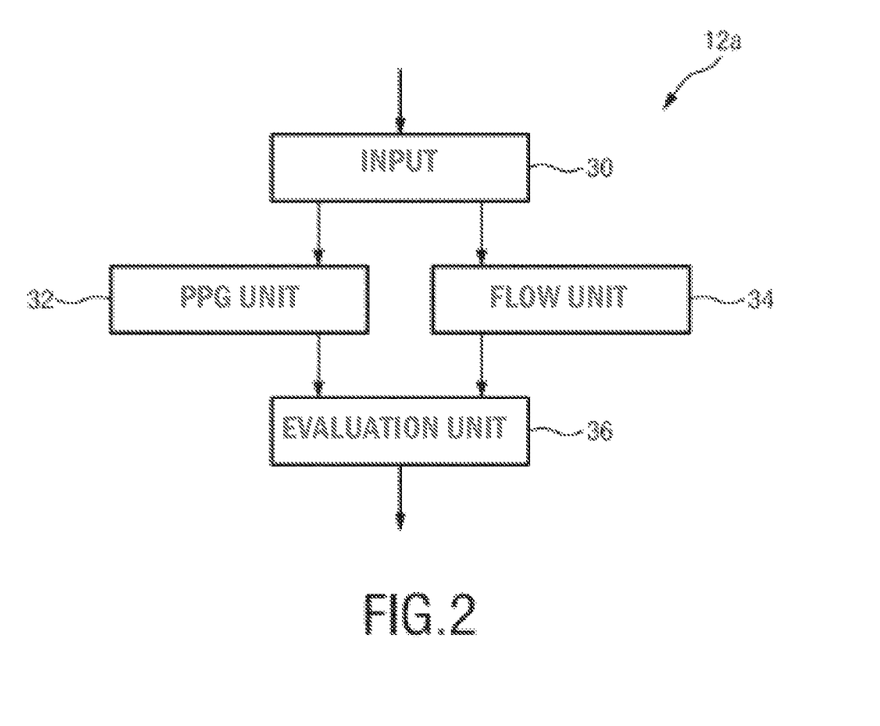
FIG. 2 shows a schematic diagram of a first embodiment of a device according to the present invention.

FIG. 2 shows a schematic diagram of a first embodiment of a device 12a according to the present invention, which may be used as device 12 in the system 10 shown in FIG. 1. The device 12a comprises an input (or input interface) 30 for obtaining (i.e. retrieving or receiving) first detection data of a tissue region of a subject, said first detection data being acquired over time by detecting radiation reflected from and/or transmitted through tissue of the subject, and for obtaining second detection data of a skin region of a subject, said second detection data comprising a sequence of images of said skin region acquired over time.

The device 12a further comprises a PPG unit 32 for deriving a PPG signal from said first detection data and a flow unit 34 for deriving a flow signal from said second detection data, said flow signal being indicative of a flow of light scattering particles within the skin region. The flow signal may e.g. be a speckle signal representing speckle or a Doppler signal representing Doppler shifts. An evaluation unit 36 evaluates said PPG signal and said flow signal to obtain information on the peripheral arterial perfusion of the subject 14. Advantageously, the evaluation unit 36 is adapted to determine (or to distinguish between) a state of low vascular compliance and/or a state of low cardiac output based on a combined evaluation of said PPG signal and said flow signal. In other words, the evaluation unit can be adapted to classify a state of the subject as a state of low vascular compliance and/or a state of low cardiac output based on the a combined evaluation of said PPG signal and said flow signal. The PPG unit 14, the flow unit 34 and the evaluation unit 36 may e.g. be implemented hard- and/or software, e.g. by one or more programmed processors or computers.

Figure 3:
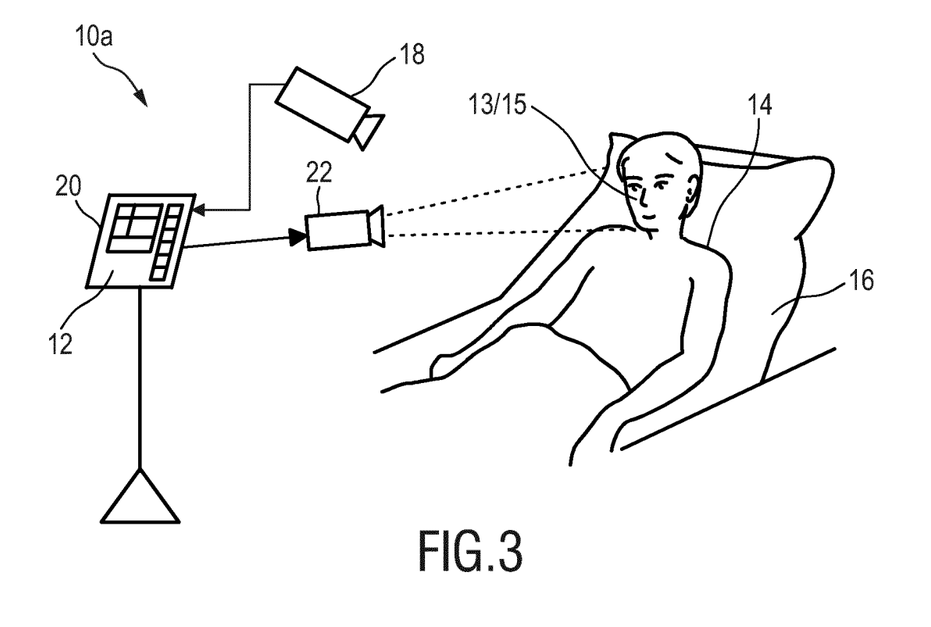
FIG. 3 shows a schematic diagram of a second embodiment of a system according to the present invention.

FIG. 3 shows a schematic diagram of a second embodiment of a system 10a according to the present invention. Different from the first embodiment of the system 10 shown in FIG. 1, the system 10a only comprises a single detector 18, i.e. the camera (or imaging unit). The second detection data acquired by the camera 18 are thus also used as first detection data for deriving the PPG signal using the above described remote PPG technique. An additional PPG sensor (19 in FIG. 1) is thus not required, and the tissue region thus corresponds to the skin region.

In the following, more details of the present invention and further embodiments will be explained.

PPG monitoring for peripheral perfusion cannot distinguish between low pulsatility caused by low vascular compliance (centralization and/or vascular stiffness) or low pulsatility caused by low cardiac output. Considering the blood vessels, the heartbeat induces a pulsatile pressure/flow variation. For the following analysis, a sinusoidal pressure variation is considered for illustration:

$$\Delta p = \Delta p_0 \cos \omega t \tag{1}$$

where $\Delta p_0$ is a pressure constant and $\omega$ is the frequency of the heartbeat.

As a reaction to this external stimulus, the blood vessels walls will dilate or contract to allow more or less blood volume to circulate through.

Blood pulsatility can be measured from the PPG signal. PPG is a technique measuring changes of blood volume in the microvascular bed of tissue, which are caused by the blood pressure variations. It is an optical technique, measuring the light absorption over time. The PPG signal is composed of a pulsatile (AC) waveform, caused by the changes in blood volume with each heartbeat, overlapped on a slowly varying (DC) component, at lower frequencies, caused by respiration and motion. As illustrated in FIGS. 1 and 3 this technique can be applied both in contact, using a contact source/detector geometry (cPPG), and remotely, using a camera (rPPG).

The flow rate q of a fluid is by definition the volume of a fluid passing by same location through an area in a given period of time, and can be expressed as:

$$q = vA \tag{2}$$

where A is the cross section area of a tubular shape, and v is the average velocity of the fluid over the area, both taken at the position where the flow rate is measured. From fluid dynamics, when given the flow through a tubular shape, the following relations can be established between external pressure $\Delta p$, fluid flow q, fluid volume $\int q dt$, and flow variation $$\frac{dq}{dt},$$

and the intrinsic mechanical properties of the tubular shape:

$$\int q dt = C \Delta p \tag{3}$$

$$q = \frac{\Delta p}{R} \tag{4}$$

$$\frac{dq}{dt} = \frac{\Delta p}{L} \tag{5}$$

where L is the inductance, R is the vascular resistance, and C, the vascular compliance, related to the elasticity of the tube wall.

A variation of the flux caused by the pulsatility can therefore be expressed as the solution to the differential equation:

$$\frac{L}{R}\frac{d^2 q}{dt^2} + \frac{dq}{dt} + \frac{1}{RC}q = \frac{-\Delta p_0 \omega \sin \omega t}{R} \tag{6}$$

where the external force is the variation in the blood pressure during the cardiac cycle according to equation (1).

A PPG signal is correlated to the blood volume in the tissue. Therefore, if this is low, according to the compliance relation (equation 3) it can be concluded that, when the pulsatility component of the PPG signal is low, corresponding to a small depth PPG signal modulation AC/DC, this can be interpreted in two ways:
  i) C is low: compliance is low, e.g. vascular stiffness;
  ii) $\Delta p$ is low: low cardiac output, blood flux stable; this implies that Rq is low, therefore either blood flow q or blood flow velocity v is low.

Therefore, in this case there is an ambiguity of the PPG method to distinguish between poor peripheral perfusion (low compliance e.g. due to vascular stiffness or centralization) and low cardiac output.

The proposed device, system and method alleviate this ambiguity. Low peripheral perfusion is associated either to low cardiac output or low vascular compliance C. If there is low cardiac output, then according to the vascular resistance relation between blood flow and pressure variation $\Delta p = Rq$, and then the blood flow q is low. In other words, should a high vascular flow q be observed the PPG signal is low, then this cannot be caused by a low cardiac output. Rather, the vascular walls do not respond to the blood pressure by varying the volume (thus low vascular compliance), but by varying the blood velocity.

In the following the equations from the fluid dynamics will be used to establish the relations between the measured signals, the blood volume and blood flow. Combining the vascular resistance R expression for laminar flow (Hagen-Poiseuille equation):

$$R = \frac{8\eta L}{\pi r^4} \quad (7)$$

with the flow dependence on resistance (equation 4) and on compliance (equation 3), where R is the resistance to blood flow, L is the length of the vessel, $\eta$ is the viscosity of the blood, r is the radius of the blood vessel, q the blood flow, and C is the vascular compliance, the following relation can be derived:

$$8\pi\eta \frac{1}{q}\frac{dq}{dt} = \left\{\frac{A^2}{q}\frac{1}{C} + \frac{2}{A}\right\}\left\{\frac{A}{q}\frac{dq}{dt} - \frac{A}{v}\frac{dv}{dt}\right\} \quad (8)$$

where $A = \pi r^2$ and equation (2) is used.

Figure 4:
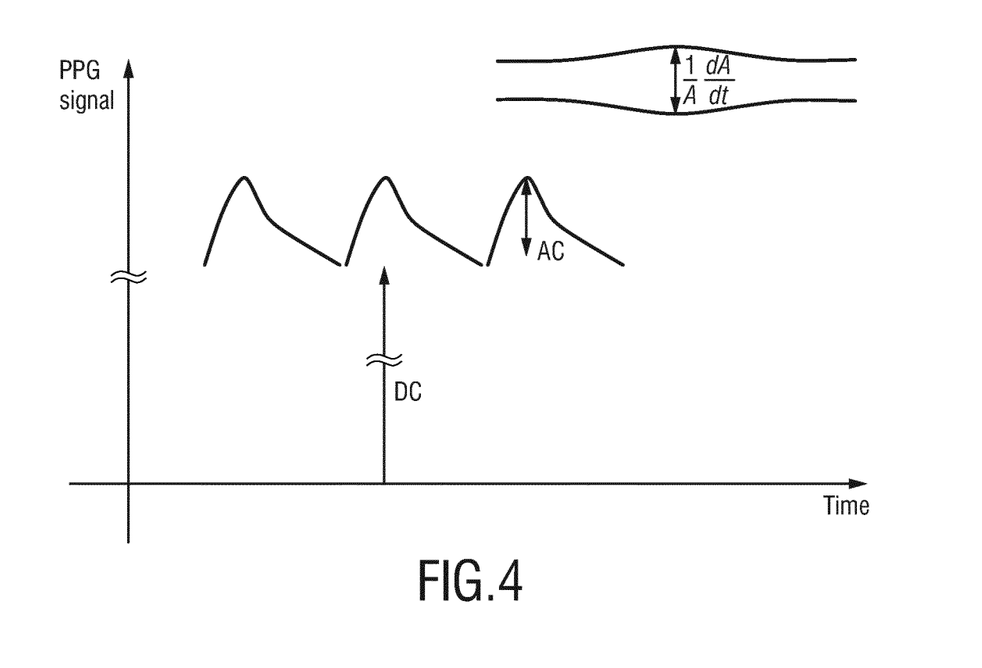
FIG. 4 shows a diagram illustrating AC and DC components of a PPG signal.

Therefore, when the vascular compliance is very low, i.e. $C \to 0$, then:

$$\frac{1}{q}\frac{dq}{dt} - \frac{1}{v}\frac{dv}{dt} \to 0 \quad (9)$$

or, equivalently:

$$\frac{1}{A}\frac{dA}{dt} \to 0 \quad (10)$$

which is correlated to the PPG signal modulation depth (AC/DC component of the PPG signal), as illustrated in FIG. 4.

However, measuring a low $$\frac{1}{A}\frac{dA}{dt},$$

according to the compliance relation, could also mean a low $\Delta p$. Using the relation (4), it can further be concluded that a low $\Delta p$ is equivalent to low:

$$\frac{1}{q}\frac{dq}{dt} = \frac{1}{v}\frac{dv}{dt} + \frac{1}{A}\frac{dA}{dt} \quad (11)$$

Clearly, measuring $$\frac{1}{v}\frac{dv}{dt}$$

could relieve the ambiguity, as follows: if $$\frac{1}{v}\frac{dv}{dt}$$

is low, then $$\frac{1}{q}\frac{dq}{dt}$$

is low, meaning low cardiac output; else, if $$\frac{1}{v}\frac{dv}{dt}$$

is high for a low $$\frac{1}{A}\frac{dA}{dt},$$

and therefore $$\frac{1}{q}\frac{dq}{dt}$$

is high, meaning that $\Delta p$ is not low, but C, the vascular compliance is low.

Therefore, measuring and combining $$\frac{1}{v}\frac{dv}{dt} \text{ and } \frac{1}{A}\frac{dA}{dt}$$

allows distinguishing between low cardiac output (and low peripheral perfusion) or low vascular compliance. Changes in vascular compliance can be detected and it can be assessed whether or not this is due to lowering cardiac output.

In the following a method will be described how to estimate vascular mechanical parameters and therefore distinguish low cardiac output from low peripheral perfusion or vascular compliance. For this, in addition to $$\frac{1}{A}\frac{dA}{dt}$$

from the PPG signal, $$\frac{1}{v}\frac{dv}{dt}$$

needs to be estimated.

To measure the blood flow velocity, speckle imaging, e.g. laser speckle imaging (LSI), is used in an embodiment. When the light, e.g. laser light, illuminates a diffuse medium, interference creates a random pattern, which is known as speckle. If there is motion in the medium, this causes motion blur in the speckle pattern, which can be used to extract information about the motion. This is done e.g. by imaging the speckle pattern. Velocity distributions are obtained by analyzing the speckle contrast variations.

Similar to the PPG signal, the speckle signal can also be decomposed as an AC component, reflecting the modulations in the blood flow velocity, and a DC component, reflecting the blood flow. Therefore, combining the two signals, poor peripheral perfusion or low vascular compliance can be distinguished from low cardiac output. A low blood volume variation, which can be observed in the PPG signal by a small AC/DC component or a small $$\frac{1}{A}\frac{dA}{dt},$$

will correspond to:
i) a small response of the blood flow velocity modulation depth $$\frac{1}{v}\frac{dv}{dt}$$

(correlated to the speckle (LSI) AC/DC signal) if the cardiac output is low, or
ii) a large response in the blood flow velocity $$\frac{1}{v}\frac{dv}{dt}$$

(correlated to the modulation depth in the LSI Signal) if the blood vessel is non-compliant (stiff, indicative of centralization). A large response in the blood flow velocity is indicative of high cardiac output.

Figure 5A:
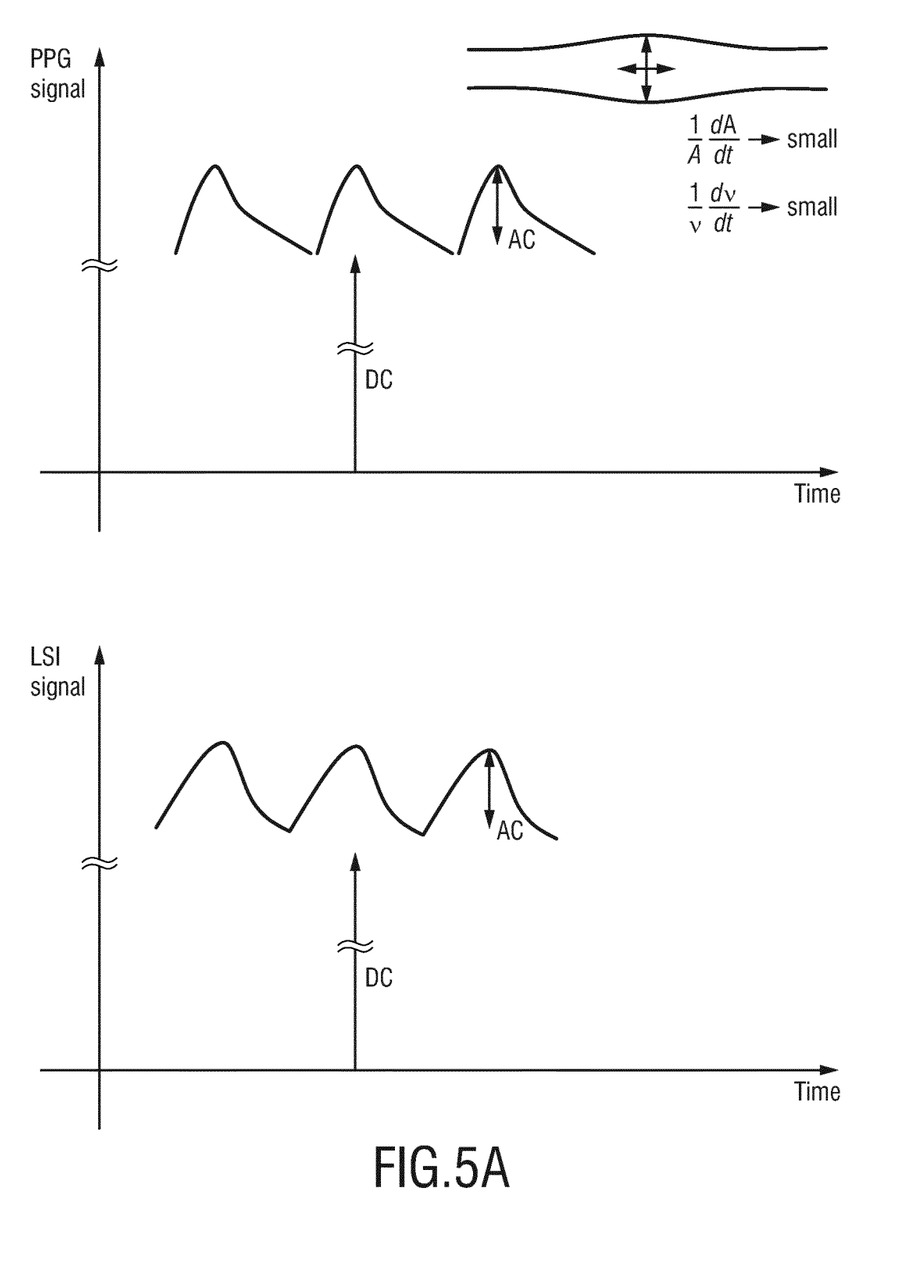
FIG. 5A shows a diagram illustrating a PPG signal with low modulation and a speckle signal with low modulation.
Figure 5B:
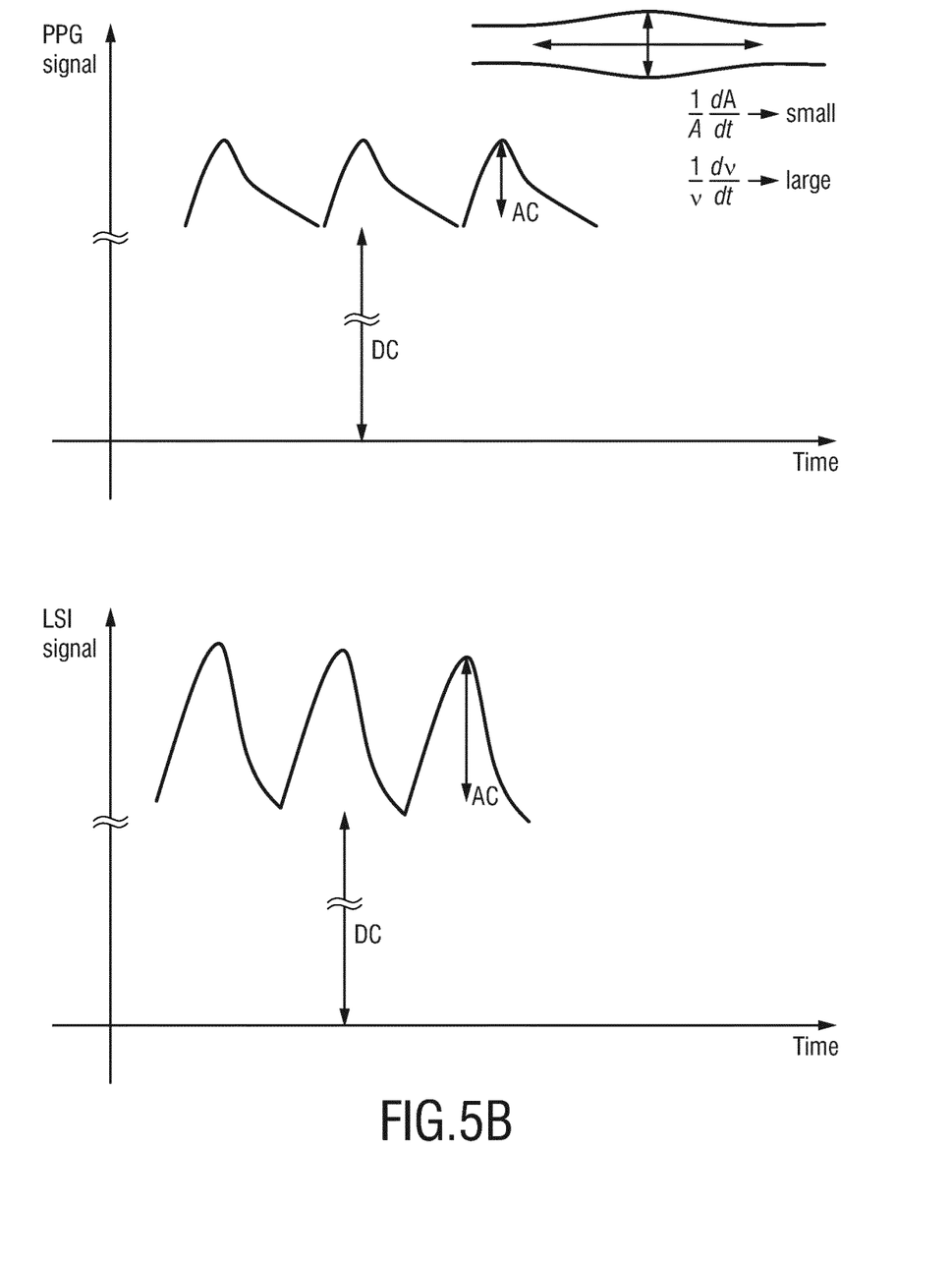
FIG. 5B shows a diagram illustrating a PPG signal with low modulation and a speckle signal with high modulation.

An illustration of the PPG signal and the speckle signal (as one embodiment for the flow signal) for different situations is shown in FIG. 5. FIG. 5A shows a situation in which the modulation in the PPG signal and the modulation in the speckle signal (LSI signal) are low (small) indicating low cardiac output. In addition to the low cardiac output, the vascular compliance can also be low. This situation may be considered as indicative of ill-compensated hypovolemia. FIG. 5B shows a situation in which the modulation in the PPG signal is low and the modulation in the speckle signal (LSI signal) is high (large) indicating low vascular compliance. In other words, the situation shown in FIG. 5B can be indicative of low vascular compliance (only) but sufficient cardiac output. This situation may be considered as indicative of well-compensated hypovolemia.

Given the considerations discussed above on the vascular response, the following reasoning can apply, which are also summarized in the following table:

| Signal | Signal intensity | Physiological vascular response |
| --- | --- | --- |
| LSI AC/DC | High | low vascular compliance (e.g. stiff |
| PPG AC/DC | Low | or centralized); indicative of well-compensated hypovolemia |
| LSI AC/DC | Low | low cardiac output; indicative of ill-compensated hypovolemia |
| PPG AC/DC | Low | |
| LSI | High | high cardiac output, low vascular compliance (stiff, perfusion up) |
| PPG | High | |
| LSI | Low | Very compliant vessels |
| PPG | High | |

When the speckle signal indicates a high flow velocity and the PPG signal measures a relatively low blood volume variation, the vascular compliance is low. In other words, the blood vessels are not sufficiently responding to the increase of blood flow. Consequently, a similar conclusion can be drawn. A normal or high vascular compliance should prevent the blood flow velocity (measurable by the speckle signal) to become high, by increasing the blood volume (PPG signal).

Based on the reasoning in the above table, the following compliance measure can be defined:

$$P = \frac{\frac{1}{A}\frac{dA}{dt}}{\frac{1}{v}\frac{dv}{dt}} = \frac{PPG: AC/DC}{LSI: AC/DC} \qquad (12)$$

An increase in P indicates an increased vasco-constriction, a decrease in P indicated decrease in cardiac output.

In summary, the proposed idea combines two measurements methods, PPG imaging and flow signal evaluation (e.g. speckle imaging (e.g. LSI) or Laser Doppler imaging). This may be based on single-camera measurement (which is contactless) or a combination of a camera measurement and a contact measurement. It does generally not require visible light. From the measurements, a PPG signal and a flow signal are derived, from which the desired information on the peripheral arterial perfusion is obtained, for instance based on a functional relationship (e.g. based on an algorithm or function) or a tabular relation (e.g. based on an look-up table, LUT) between the compliance measure P and the PPG signal amplitude and flow signal amplitude.

In addition to differentiating between low cardiac output and low vascular compliance, activity, posture, biometrics and/or vital signs can be determined and monitored, particularly from the obtained second detection data. This information may be used in addition in the decision about arterial perfusion.

Another advantage of the proposed solution is that, since it is based on local area measurement, it can conveniently measure compliance on easily accessible areas, such as face, arm, etc. As explained above, although the method is preferably designed for remote measurement, it can also be applied in contact.

Furthermore, since a light-based solution is proposed, the measurement can take place either in the non-visible part of the spectrum, enabling measurements in dark, and/or in the visible range.

Figure 6:
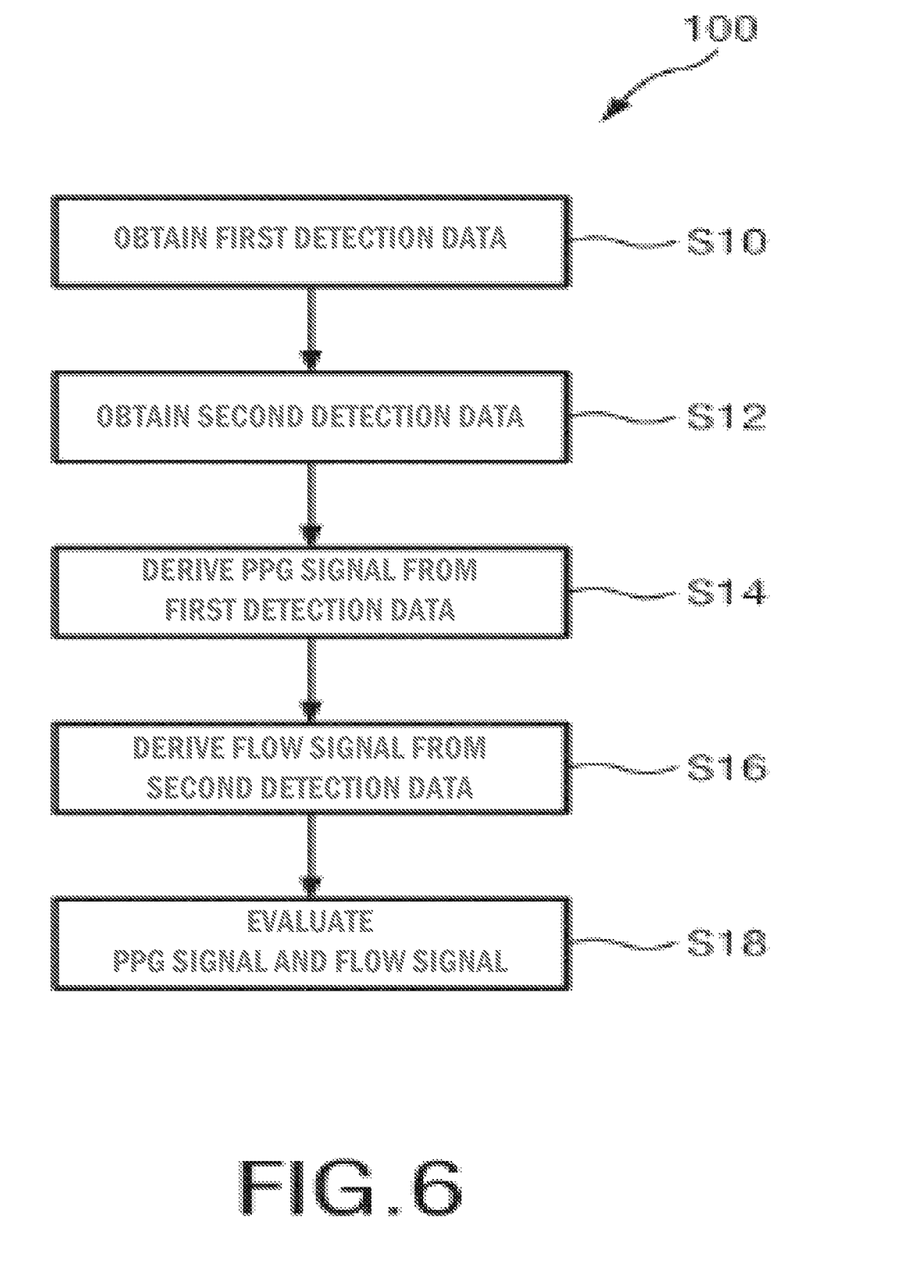
FIG. 6 shows a flow chart of a method according to the present invention.

A flow chart of an embodiment of a method 100 according to the present invention is illustrated in FIG. 6. In a first step S10 first detection data of a tissue region of a subject are obtained. In a second step S12 second detection data of a skin region of a subject are obtained. In a third step S14 a PPG signal is derived from said first detection data. In a fourth step S16 (which may also be carried out before or simultaneous to the third step S14) a flow signal is derived from said second detection data. In a fifth step S18 said PPG signal and said flow signal are evaluated to obtain information on the peripheral arterial perfusion. A state of low vascular compliance and/or a state of low cardiac output can be determined based on a combined evaluation of said PPG signal and said flow signal.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A processing device for use in monitoring of peripheral arterial perfusion of a subject, said processing device comprising:
    an input for receiving first detection data of a tissue region of a subject, said first detection data being acquired over time by detecting radiation reflected from and/or transmitted through tissue of the subject, and for receiving second detection data of a skin region of a subject, said second detection data being acquired over time by detecting radiation received from said skin region in response to coherent light being emitted towards said skin region,
    a PPG unit for deriving a photoplethysmography PPG, signal from said first detection data,
    a flow unit for deriving, from said second detection data, a flow signal indicative of a flow of light scattering particles within the skin region, and
    an evaluation unit for individually evaluating said PPG signal and for individually evaluation said flow signal to obtain information on the peripheral arterial perfusion,
        wherein the evaluation unit is adapted to determine at least one of a state of low vascular compliance and a state of low cardiac output based on a combined evaluation of an individual evaluation of said PPG signal and an individual evaluation of said flow signal,
        wherein said evaluation unit is configured to evaluate a PPG ratio of an AC component to the DC component of the PPG signal and a speckle ratio of an AC component to a DC component of the flow signal,
        wherein said evaluation unit is configured to determine a state of non-compliant blood vessels and a high peripheral perfusion if the speckle ratio exceeds a second speckle threshold and if the PPG ratio exceeds a second PPG threshold and to determine a state of compliant blood vessels if the speckle ratio is below the second speckle threshold and if the PPG ratio exceeds the second PPG threshold.

2. The processing device as claimed in claim 1, wherein the flow unit is configured to derive the flow signal based on a laser Doppler and/or laser speckle technique.

3. The processing device as claimed in claim 1, wherein said evaluation unit is configured to evaluate a speckle pattern represented by said flow signal.

4. The processing device as claimed in claim 3, wherein said evaluation unit is configured to evaluate motion blur by detecting speckle contrast variations.

5. The processing device as claimed in claim 1, wherein said evaluation unit is configured to determine a state of well-compensated hypovolemia of the subject if the speckle ratio exceeds a first speckle threshold and if the PPG ratio is below a first PPG threshold and to determine a state of ill-compensated hypovolemia of the subject if the speckle ratio is below a second speckle threshold and if the PPG ratio is below the first PPG threshold.

6. The processing device as claimed in claim 1, wherein said evaluation unit is configured to evaluate a compliance measure P indicative of a ratio of the speckle ratio to the PPG ratio given by $$P = \frac{AC_{PPG}/DC_{PPG}}{AC_{flow}/DC_{flow}};$$

wherein the speckle ratio is the ratio of the AC component to the DC component of the flow signal; and wherein the PPG ratio is the ratio of the AC component to the DC component of the PPG signal.

7. The processing device as claimed in claim 1, wherein said input is configured to obtain said first detection data acquired in response to artificial illumination of the tissue by predetermined radiation, in particular visible or infrared light.

8. The processing device as claimed in claim 1, wherein the input is configured to receive said first detection data and said second detection data from a single detector or from different detectors.

* * * * *